June 8, 1943.   W. H. MURAD   2,321,312
CONTROL SYSTEM FOR CAPSTAN LATHES
AND LIKE MACHINE TOOLS
Filed July 1, 1941

INVENTOR
Wadia Halim Murad
BY Sager & Malcolm
ATTORNEYS

June 8, 1943.  W. H. MURAD  2,321,312
CONTROL SYSTEM FOR CAPSTAN LATHES
AND LIKE MACHINE TOOLS
Filed July 1, 1941   6 Sheets-Sheet 2

INVENTOR
Wadia Halim Murad
BY
Sager & Malcolm
ATTORNEYS

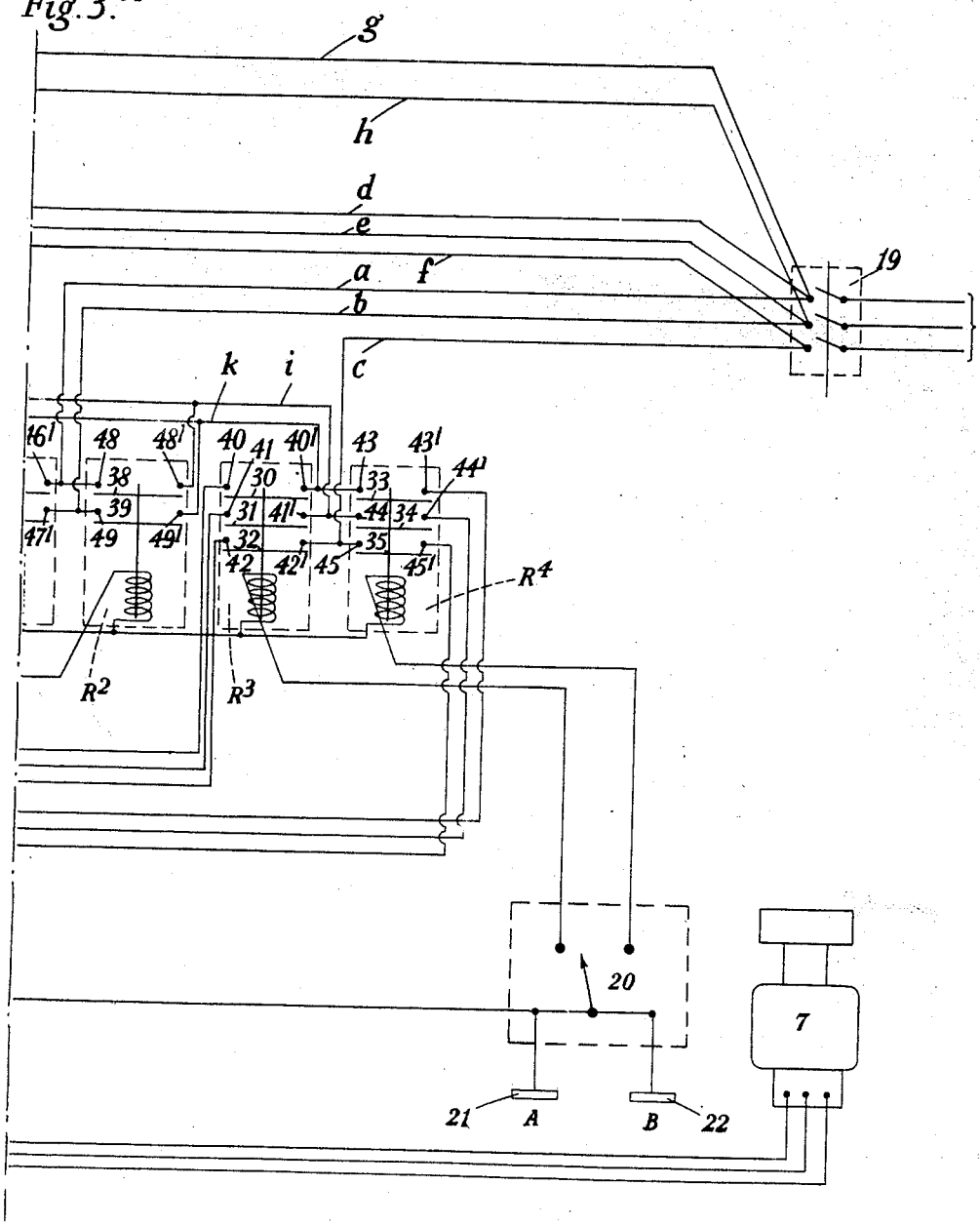

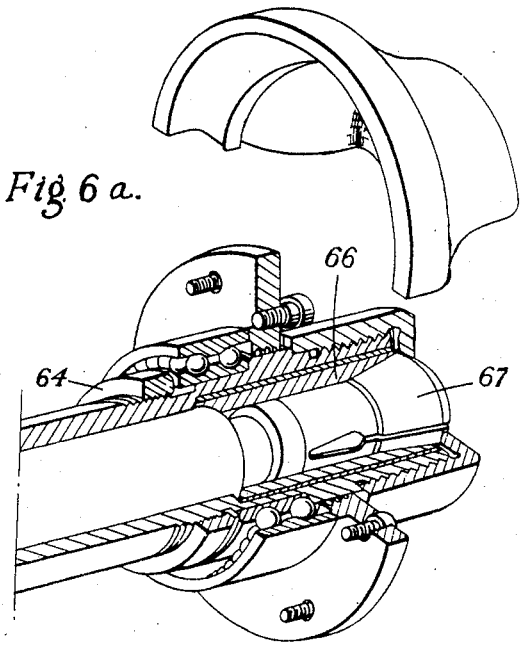

Patented June 8, 1943

2,321,312

UNITED STATES PATENT OFFICE 2,321,312

CONTROL SYSTEM FOR CAPSTAN LATHES AND LIKE MACHINE TOOLS

Wadia Halim Murad, Watford, England

Application July 1, 1941, Serial No. 400,593
In Great Britain February 21, 1940

2 Claims. (Cl. 29—64)

This invention relates to capstan lathes and machine tools in which a plurality of machining operations are carried out on bar stock fed through and gripped in a driven rotating spindle.

With machine tools of this kind, the operative is required at each working cycle, i. e. for each piece of work done, to carry out a number of routine operations, as well as to control the movement of the different tools and the speed of the driving motor. In the case of a capstan lathe these routine operations comprise reversing the driving motor, opening and closing the work gripping means, for instance a toggle operated chuck of the split collet type in the driving spindle, withdrawing the turret slide, and indexing the turret. These operations are usually performed with the aid of mechanical means such as levers connected with the respective switching means or moving parts and distributed about the machine within reach of the operative. With a view to simplifying the manual control, it has been proposed to govern two or more operations, for instance drive reversing and collet opening and closing, from one control lever or "joy-stick" adapted for movement in more than one plane, but arrangements of this kind are complicated in construction and maintenance and also confusing and apt to lead to mistakes in handling. It is the object of the present invention to provide a control system for capstan lathes and like machine tools which is straightforward in construction, readily accessible for maintenance and repairs, and simple and reliable to operate.

According to the invention, a capstan lathe or the like is driven by an electromotor controlled by one or more sets of electromagnetically operated switch gear which are in turn selectively controlled by manually operable contacts.

By virtue of this arrangement, it becomes possible to mount the switch gear sets in the form of a unit in a convenient position near the driving motor, thus simplifying the wiring of the main circuits, while the individual operating contacts and their manual controls comprised in subsidiary circuits may be positioned and arranged in such a manner as to meet the needs of convenience and reliability in serving the machine.

For instance, according to a further feature of the invention, switch gear sets adapted to perform the switching operations required for effecting forward and reverse running of the driving motor are governed by contacts actuated, respectively, by two settings of a control lever mounted in the front wall of the machine for operation by the left hand, while further sets of switch gear for effecting full speed and reduced speed running of the driving motor are governed by contacts actuated, respectively, by plunger pedals placed beneath the machine for convenient operation by the foot.

Owing to the separation of the control mechanism into electromagnetically controlled switch gear and manually controlled contacts it becomes possible to effect, under the control of a simple manual operation, such as the movement of a lever or the pressing of a button, a controlling cycle involving a plurality of switching operations or a sequence of switching operations. This is of particular value in connection with changing the speed of the driving motor, since it enables the risk of damage and the loss of time involved in the use of a manually operated rheostat to be avoided.

In further development of the invention, other of the routine operations mentioned at the outset, and not only those concerned with the running of the driving motor, may be effected electromechanically under the described system of control, thus reducing the aggregate expenditure of human energy in serving the machine and enabling the operative to concentrate on the guiding and manipulation of the tools. Thus, in the case of a capstan lathe, the opening and closing of the collet to allow a fresh length of stock to be fed through the spindle may be effected through suitable gearing by power derived from the driving motor or from a separate electromotor under the control of a set of electromagnetically operated switch gear controlled by contacts actuated manually. The manual actuation of the contacts for controlling these and like operations may also be indirect, that is to say the contacts in question may be actuated in dependence on the movement of a manually operated part of the machine.

According to a further feature of the invention, the several sets of electromagnetically operated switch gear are assembled on a common bracket or support which is normally housed within the body or pedestal of the machine but hinged thereto so that it can be swung out for inspection, adjustment and repair, the electric leads being conveniently gathered together and bundled at the hinged end of the support so as to provide for unimpeded movement of the assembly.

A further feature of the invention consists in interposing between any set of control contacts in the described system, and the manually operable member by which these contacts are actuated, transmission means such as eccentric mechanism or cam mechanism which ensures smooth and steady opening and closing of the contacts irrespectively of the manner in which the control member may be operated. Fixed stops are provided on the control member co-operating with abutments on the machine. Shocks due to violent handling of the controls will then not be transmitted to the contacts.

The switch gear, which is required to carry the full load of the current fed to the driving motor is preferably immersed in oil, and it will be understood that the subsidiary or "relay" circuits comprising the control contacts may be designed to carry only a fraction of this load, which contributes further to the safety and reliability of the control system according to the invention.

In order to facilitate the establishment of the described control system it is desirable to enable each of the tool positions, of which there are usually six, on the turret, to be used for holding a working tool. To this end, the invention further comprises equipping a machine tool of the kind described with an independently operable front stop adapted to be moved into and out of the path of the automatically fed bar stock. It then becomes possible to set up the working tools in the turret in the order in which they are to be used, without one position having to be occupied by a stop anvil, and to confine the operations of moving the turret slide and indexing the turret to a simple sequence determined by the number of machining operations to be performed.

In a preferred embodiment, as applied for instance to a capstan lathe, the independent stop comprises an arm carrying an adjustable anvil and attached to a longitudinally adjustable carrying member rotatably supported at the back of the head portion of the machine, for instance by means of brackets. The carrying member, which also serves for rough adjustment of the stop position, is coupled, for instance by a suitable linkage, to a manual or mechanical control member by which it is rotated through a predetermined angle to swing the arm, thereby alternatively bringing the stop anvil into alignment with the work and moving the same clear of the path of the tools.

In the interests of simplicity and reliability of control, the invention further comprises improvements in toggle lever actuating mechanism for operating a split collet type chuck in the spindle of a machine tool of the kind with which the invention is concerned. These improvements have for their object to reduce the rear overhang of the spindle thereby lessening the danger of "whip" and the load on the spindle bearings. To this end, in accordance with the invention, the collet thrust sleeve in the rotating spindle of a machine tool of the kind referred to bears with its rear end against a substantially axially movable thrust arm of cranked levers the loaded arm of which extends rearwardly of the spindle and is depressed to exert a forward thrust on said sleeve.

In a preferred form of construction, two cranked levers are used, which are pivoted in slots in a toggle frame mounted on the rear end of the spindle and are actuated by an axially movable collet ring embracing the slotted portion of the frame and having sloping cam surfaces adapted to coact with the outer ends of the levers, so that when the collet ring is moved axially towards the spindle, the rearwardly extending arms of the levers are depressed and the thrust arms move the sleeve forwards in the spindle.

In order to allow for the free passage of the bar stock through the toggle frame, the cranked levers have the inner edge of their rearwardly extending arms normally inclined outwards at such an angle to the axial that when these arms are in the extreme depressed position they do not interfere with the movement of the bar stock. To obtain maximum effort with small dimensions, the cranked levers are preferably of the rocket type having a heel portion constituting the thrust arm and fulcrumed at a point close to the plane of contact between the heel portion and the rear end of the thrust sleeve. In this way a higher leverage ratio and more direct thrust is obtained than is possible with the conventional arrangement in which the loaded arm of the levers extends forwardly of the outer end of the spindle and is lifted to exert force on the thrust sleeve, since in the latter case the actuated arm is outside the spindle and the thrust arm must necessarily extend through or past the thickness of the spindle before it can bear against the end face of the thrust sleeve.

In order that the invention may be more readily understood, an embodiment thereof, taken by way of example, will now be described in greater detail, with reference to the accompanying drawings, in which:

Figures 3 and 3a show a circuit diagram of the electrical control system.

Figures 6 and 6a show the collet chuck and its supporting and operating means, in sectional perspective view.

Figure 1:
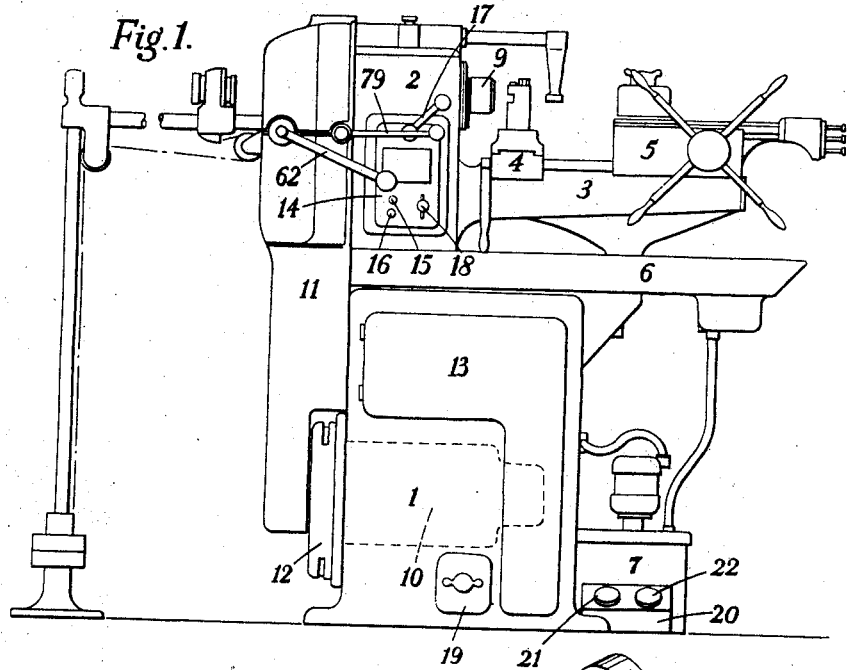
Figures 1 and 2 show, in more or less diagrammatic front elevation, and end elevation, respectively, the general lay-out of a capstan lathe equipped with the centralized electrical control and other features contributory to the carrying into effect of the principle of the invention.
Figure 2:
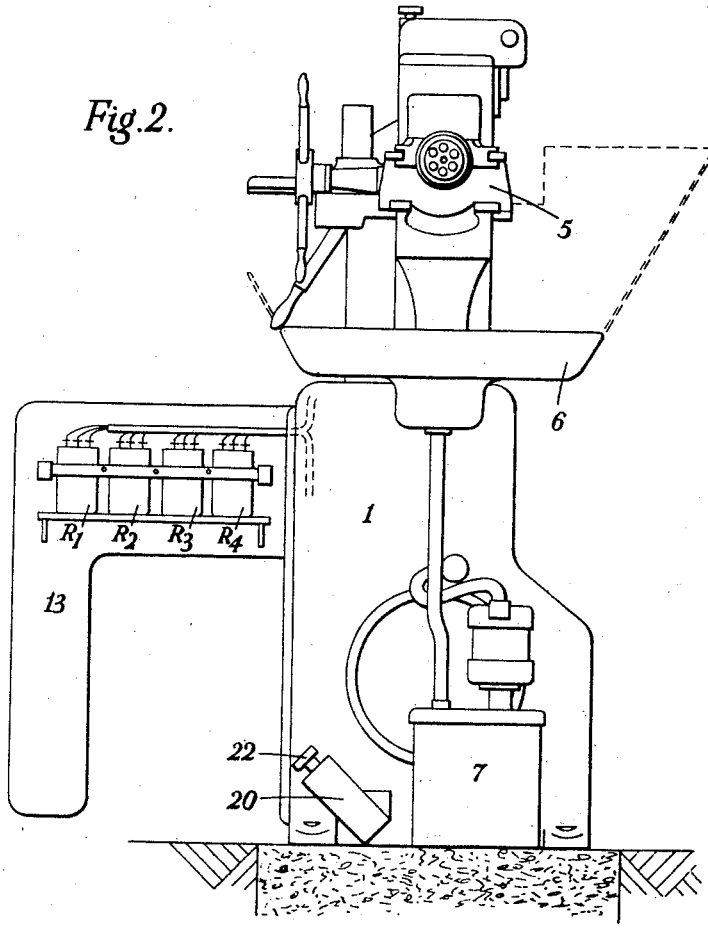

Referring more particularly to Figures 1 and 2 of the drawings, 1 denotes the pedestal of a capstan lathe carrying, in conventional manner, a headstock supporting structure 2 and bed 3 for a saddle 4 and turret assembly 5 and a tray 6 for the catching of coolant supplied from a circulation pumping unit 7 assembled against the inner side face of the pedestal 1.

Figure 6:
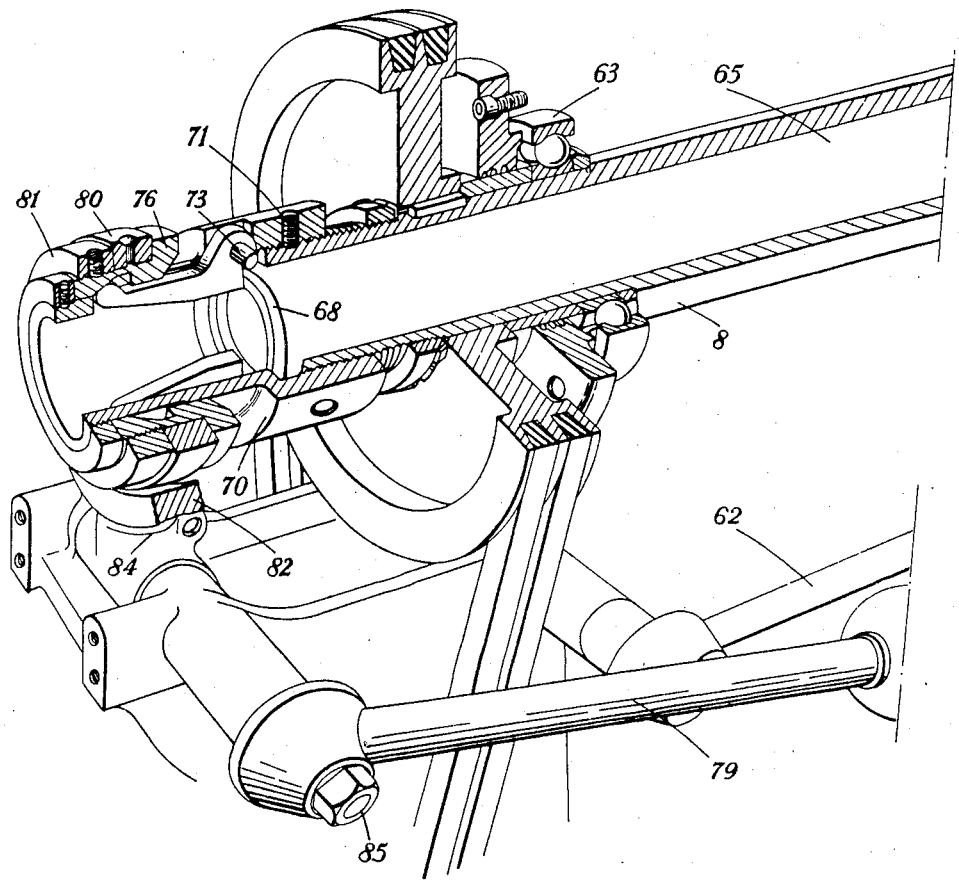

The headstock comprises a hollow main spindle 8, Figure 6, and split collet type chuck denoted generally by 9, through which bar stock is fed automatically, when the chuck is opened, by means of conventional weight-operated feed mechanism indicated in outline on the left in Figure 1.

The main spindle 8 is driven from an electromotor 10 housed in the lower part of the pedestal 1, through the intermediary of belt and pulley multi-speed transmission gearing housed in an end casing 11 which embraces the rear end of the headstock supporting structure 2 and extends downwards past the pedestal 1 so as to enclose the belt and part of the driving pulley 12 coupled to the motor 10.

The working conditions of the motor 10 are governed by a centralized control system embodying relay units R1, R2, R3 and R4 mounted, for ease of access, on the inner side of a door 13 hinged to the front wall of the pedestal 1. In Figure 2, the door 13 is shown swung out at right angles to the pedestal wall, exposing the relay units to view. In the corresponding wall of the headstock superstructure 2 there is fitted a control panel 14 carrying start-stop push buttons 15, 16, a reversing switch lever 17 and a rotary switch knob 18 for controlling the motor of the coolant pumping unit 7. Mounted in a convenient position at the bottom of the front wall of the pedestal 1 is an isolating switch or circuit breaker 19 the contacts of which are interposed in the supply mains. A change-over switch 20 for governing two alternative speeds of the motor 10 is mounted against the base of pedestal 1 on the same side thereof as the coolant pumping unit 7, within convenient reach of the operative's foot, and has its moving contact member coupled to two plunger pedals 21, 22 for effecting movement alternatively into the "fast" and "slow" positions, respectively, of the switch.

Figure 3:
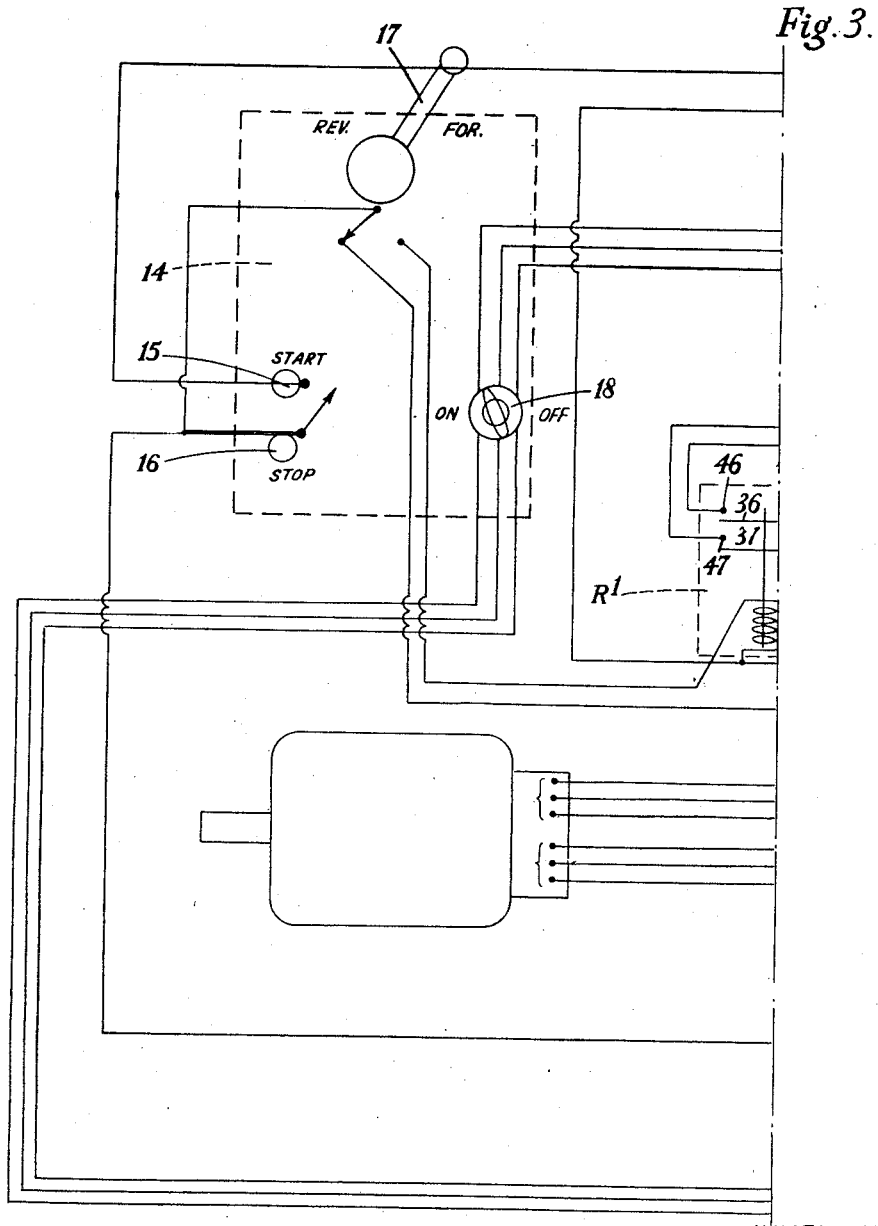

Referring now to Figure 3, three-phase supply mains are connected to the input terminals of the isolator switch 19 to the output terminals of which are connected three power circuit leads a, b, c, and three coolant pump circuit leads d, e, f. In the present instance, two control leads g and h are also connected to two of the outlet terminals of switch 19. The driving motor 10 is of the two speed A. C. type having a fast and a slow winding, and the arrangement of the control system is such that mains current is fed alternatively to these windings according to which of the relay units R3, R4, is energised in response to operation of the pedal switch 20, while the direction of rotation of the motor at either speed is determined by the alternative energisation of relays R1 and R2 in response to the setting of switch lever 17.

To this end, each of the relay units R3 and R4 has three moving contact arms adapted to bridge three pairs of fixed contacts simultaneously when the relay winding is energised. The contact arms associated with relay R3 are denoted by 30, 31 and 32 and the respective pairs of fixed contacts by 40, 40', 41, 41', and 42, 42', while the contact arms associated with relay R4 are denoted by 33, 34, 35 and the respective pairs of fixed contacts by 43, 43', 44, 44', and 45, 45'. The relay units R1 and R2 serving for effecting changes of direction of rotation of the motor by reversing poles of the leads to the motor windings, each have two contact arms denoted respectively by 36, 37 and 38, 39 which coact with pairs of fixed contacts denoted by 46, 46', 47, 47', 48, 48', and 49, 49', respectively.

The contacts 40, 41, 42 of relay R3 are connected to the terminals of the motor fast winding, while the contacts 43', 44', 45' of relay R4 are connected to the terminals of the motor slow winding. Of the remaining contacts of these two relays, contacts 42' and 45 are connected together and to the neutral wire c of the power circuit, while the further pairs of contacts 41', 44 and 40', 43 are likewise connected together and to two leads i and k, respectively, associated with contacts of relays R1 and R2 for effecting reversal of polarisation. For this purpose, the pairs of contacts 46', 48 and 47', 49 are connected together and to the power circuit leads a and b, respectively, while contacts 47 and 48' are connected to lead i and contacts 46 and 49' to lead k. It will thus be clear that when the coil of relay R1 is energised, lead a will be connected, through contact 46', arm 36, contact 46 and lead i, to contacts 41' and 44 and lead b, through contact 47', arm 37, contact 47 and lead k, to contacts 41' and 43, in readiness for completion of a motor circuit by operation of either of the relays R3, R4, to rotate the motor at fast or slow speed in one direction, while when the coil of relay R2 is energised the connection of leads a and b to the same pairs of contacts of relays R3 and R4 is reversed with the result that the motor will rotate in the opposite direction on operation of relay R3 or R4.

The control circuit is laid out as follows. Lead h is connected to one terminal of each of the relay coils. The other terminal of relay R1 is connected in series with one contact of reversing switch 17, the contact arm of this switch (when in the "reverse" position), and the start-stop switch 15, 16, to the lead g, while the other terminal of relay R2 is similarly connected, through the other contact of the reversing switch 17. The other terminals of relays R3 and R4 are similarly connected, through the respective contacts of the foot operated change-over switch 20, and the start-stop switch 15, 16, to lead g, as will be clear from the circuit diagram of Figure 3. In the arrangement shown, relay R1 is operated when the control lever of switch 17 is in the "reverse" position, R2 when this lever is in the "forward" position, R3 when the "fast" pedal 21 is depressed and R4 when the "slow" pedal 22 is depressed, provided in every case the "start" button of switch 15, 16 has first been depressed and isolator switch 19 closed.

In the present instance the control circuits are supplied with current from the mains, but it will be understood that if desired an independent source of current may be employed for this purpose and also that the current strength required in these circuits need not be higher than that required to energise the relay coils. The use of a weaker current for the control circuits enables switching means of lighter and simpler construction to be employed and reduces the risk of accidents due to faulty insulation.

The relay units, preferably assembled in oil-filled containers, are mounted in a suitable support attached to the inner side of door 13, as indicated in Figure 2, and the wiring is bundled or laid in flexible conduits and held in position along the hinged edge of the door so as to be disturbed as little as possible when the door is opened to give access to the motor or the control equipment.

The leads d, e, f, are taken directly to the motor of the coolant pumping unit, with the interposition of switch 18 at the control panel 14.

In the described example, the centralised electric control system comprises the controlling of the driving motor and coolant pumping unit only.

As described in connection with the present example, it is advisable to arrange for the individual controls to be operable in a distinctive manner, so as to avoid confusion.

Figure 4:
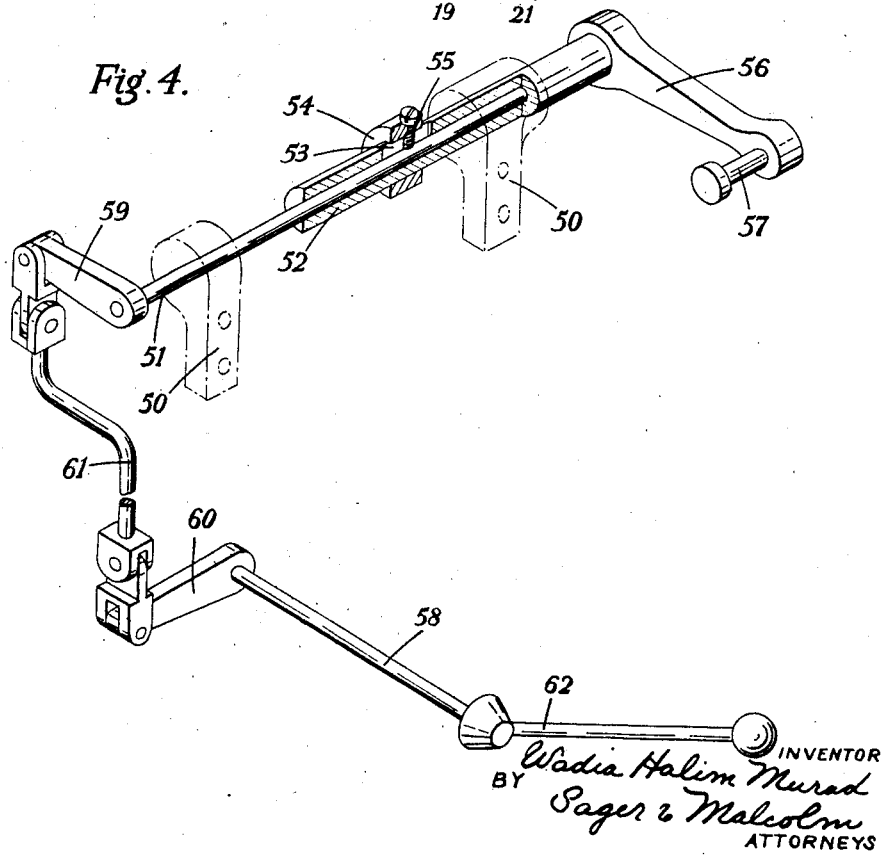
Figure 4 is a diagrammatic perspective view of the independent swinging stop and its operating mechanism.

From the point of view of centralization of control and reduction of the number of repetition operations to be performed in the using of a capstan lathe or like machine tool of the kind to which the invention pertains, it is desirable to avoid the use of a stop for the bar stock feed occupying one of the tool positions on the turret, since this necessitates indexing the turret and operating the turret slide after the final operation on each piece of work. To this end, I provide an independent adjustable stop mounted on a swinging arm and operable by means of a control lever suitably positioned for convenient manipulation in conjunction with the other controls of the centralised system. An example of such arrangement is shown diagrammatically in Figure 4. Two bearing brackets 50, 50 are attached to the back of the headstock supporting structure 2 and have eyes serving as bearings for an extensible member comprising a rod 51 and a sleeve 52 slidably engaging said rod. For a portion of its length located between the bearing brackets 50, 50, the sleeve 52 is slotted, as at 53, and is embraced by a collar 54 carrying a set-screw 55 adapted to engage the slot and bear against the rod 51. The member 51, 52 may thus be extended or shortened within considerable limits and adjusted as to the angular relation between its two parts, and, when the set screw 55 is tightened up, will behave as a single rotatable unit. To the forward end of the sleeve 52 is secured an arm 56 extending at right angles thereto and carrying at its outer end a stop anvil 57 extending inwardly with respect to the headstock supporting structure and parallel with the sleeve 53. The free end of rod 51 is coupled for rotation with a rod 58 extending through or past the headstock supporting structure from front to back thereof, by means of a linkage comprising an arm 59 attached to rod 51, an arm 60 attached to the rear end of rod 58 and a pull rod 61 connecting the free ends of arms 59 and 60. An operating lever 62 is fast to the forward end of rod 58, and the described linkage is so arranged and supported that the lever 62 occupies a convenient position near the other controls, see Figure 1, and has an arc of movement which does not impede the operation of these other controls. The dimensions of the parts of the described independent stop and its operating mechanism are such that the operating movement of lever 62, which is limited by conventional stop means, effects a swinging movement of arms 56 and stop 57, as indicated by arrows, between two extreme positions in one of which the stop 57 is in axial alignment with the spindle 8 and in the other of which the arm 56 and stop 57 are swung clear of the path of the work and of the tools when brought into their working positions. The length of the member 51, 52, and with it the spacing of the stop face from the chuck face, is adjustable with the aid of the set-screw 55, so as to arrest the stock fed through the spindle and chuck at the required length for the work in hand.

Figure 5:
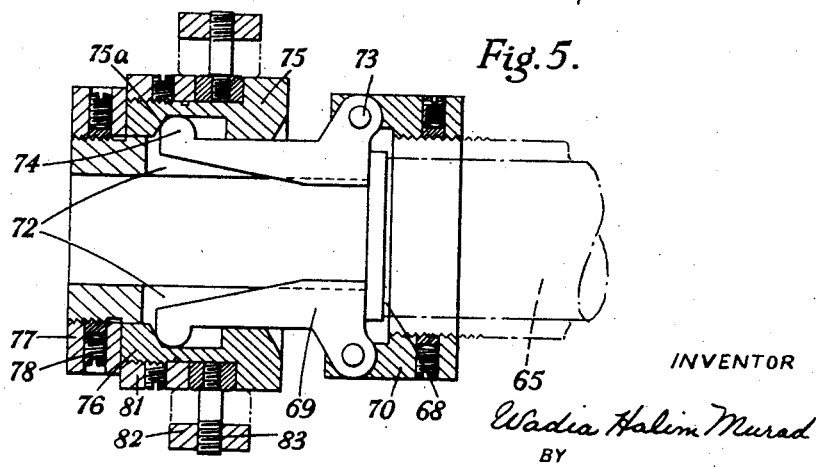
Figure 5 is a longitudinal axial section of the mechanism for operating the collet chuck of the lathe.

In order to reduce the rear overhang of the spindle, so as to obtain freedom from "whip" and the other advantages referred to, in connection with an improved machine tool with centralised control according to the invention, the collet operating mechanism shown in Figures 5 and 6 is employed. Longitudinally slidable within the spindle 8, which is supported in a rear floating bearing 63 and a forward combined thrust bearing 64, is a sleeve 65 the forward end of which bears against the end face of a flared-mouth sleeve 66 embracing the skirt and tapered gripping portion of a split collet 67. The rear end of sleeve 65 bears, with the interposition of a hardened thrust ring 68, against an abutting face on the shorter arm of a plurality of angle levers 69 pivoted in a tubular toggle frame 70 threaded on the rear end of spindle 8 and locked thereon by means of locking grub screws 71. The levers 69 are accommodated in slots 72 in the frame member 70 and are pivoted by means of pins 73 engaging the sides of these slots in an enlarged portion of the frame member, at a point near the plane of the abutting faces and outside the circumference of the thrust ring 68 and sleeve 65, as shown in Figure 5, for movement radially with respect to the frame member. The longer arm of each lever 69 extends rearwardly of the spindle and terminates in an outwardly projecting head 74 which engages in a slot 75 having a forwardly and outwardly sloping surface 75a, in a ring 76 which is longitudinally slidable on the reduced portion of the frame member 70. The ring 76 bears normally against a keeper ring 77 threaded on the rear end of the frame member 70 and locked thereon by means of grub screws 78 and has a considerable range of movement forwardly from this position by virtue of a clearance between the ring 76 and the shoulder formed by the enlarged portion of the frame member 70. Such movement of the operating ring 76 causes the heads 74 to ride up the sloping surfaces 75a thereby pressing the longer arms of the levers 69 radially inwards and imparting an axial movement, through the shorter arms of these levers, to the sleeve 65 for the purpose of operating the collet 67 (Figure 6). In order to permit of this inward movement of the levers 69 without interfering with the passage of bar stock through the frame member 70 and sleeve 65, the under side of the levers 69 is tapered off so as to have an outward slope when the levers are in the spread position.

Movement of the operating ring 76 is effected by means of conventional toggle mechanism operated by a control lever 79 positioned near the stop control lever 62 and the switchboard 14 of the electric control system. This mechanism comprises a thrust ring 80, preferably of bronze, embracing the operating ring 76 with working clearance and confined, with similar clearance, between a shoulder at the forward end of the ring 76 and a keeper ring 81 threaded and locked on the rear end of ring 76. The thrust ring 80 is encircled, with substantial clearance, by a toggle ring 82 connected thereto by pins 83 disposed in one or more diametrically opposed pairs (Figure 5) and linked in its turn to a toggle fork 84 which is fast on a shaft 85 to which the collet operating lever 79 is coupled.

By virtue of the described arrangement, the rear overhang of the spindle is reduced to a minimum and a powerful thrust action is exerted on the collet operating sleeve 65 with the aid of mechanism which is simple and compact, and readily accessible in all its parts.

When an independently operable stop as described above is used, the operations of the collet and stop may be co-ordinated in a fixed cycle effected mechanically in the required sequence under the control of a switch gear set pertaining to the described control system. Since in this case the switching operations require to be performed in timed relation to each other, the appropriate switch gear will comprise a plurality of time delay relays, which may be of known type, or relays controlled, when once the sequence has been initiated, by subsidiary contacts associated with the stop and collet operating mechanism. The same considerations apply in the case of any other sequence of operations co-ordinated in a single cycle to be performed by a set of electro-magnetically operated switch gear in response to the manual closing or opening of a subsidiary control circuit in the manner described above in connection with the controlling of the driving motor.

What I claim and desire to secure by Letters Patent is:

1. In a capstan or the like lathe, including a spindle, a multi-phase electric motor geared to the spindle for selectively driving the same in respectively opposite directions at fast and slow speeds, the motor having fast and slow speed windings and being reversable by reversing the phase in either of the windings, an input circuit including two phases, first and second relays normally open and having the inputs thereof connected to said phases, a forward and reverse switch movable selectively to actuate either of said relays, the second relay being arranged to reverse said phases, third and fourth relays each having the inputs thereof connected to the outputs of said first and second relays with the outputs thereof respectively connected to said fast and slow speed windings, and a fast and slow speed switch movable selectively to actuate either of said third and fourth relays.

2. In a capstan or the like lathe, including a spindle, an electric motor geared to the spindle for selectively driving the same in respectively opposite directions at fast and slow speeds, said motor having fast and slow speed windings and being reversible by reversing the phase in either of said windings, an input circuit, first and second relays normally open and having the inputs thereof connected to said input circuit, a forward and reverse switch movable selectively to actuate either of said relays, third and fourth relays each having the inputs thereof connected to the outputs of said first and second relays with the outputs thereof respectively connected to said fast and slow speed windings, said first and second relays being connected to reverse the phase in the input of said third and fourth relays, and a fast and slow speed switch movable selectively to actuate either of said third and fourth relays.

WADIA HALIM MURAD.